United States Patent Office 3,551,357
Patented Dec. 29, 1970

3,551,357
PROCESS FOR THE PRODUCTION OF CROSS-
LINKED ACRYLATED COPOLYMERS
Herbert Corte, Opladen, and Harold Heller, Leichlingen,
Germany, assignors to Farbenfabriken Bayer Aktienge-
sellschaft, Leverkusen, Germany, a corporation of Ger-
many
No Drawing. Filed Apr. 1, 1968, Ser. No. 717,933
Claims priority, application Germany, June 14, 1967,
F 52,675, F 52,677
Int. Cl. C08f *19/00*
U.S. Cl. 260—2.1
11 Claims

ABSTRACT OF THE DISCLOSURE

A hydrolysis-resistant, insoluble cross-linked acrylate copolymer of an acrylic acid ester and a crosslinking agent of the formula $$X-A-Y$$
$$|$$
$$Z_n$$

in which A represents an aromatic or cycloaliphatic radical, X represents an alkyl radical containing a terminal olefinic unsaturation or has the same meaning as Y, Y represents the radical $$-C=C-R'$$
$$|\ \ |$$
$$R\ \ R$$

in which R represents a hydrogen atom or a lower alkyl radical and R' represents a carboxyl, alkoxycarbonyl, cycloalkoxycarbonyl, phenoxycarbonyl, chlorocarbonyl, carbamoyl or cyano radical, Z represents a lower alkyl radical or a halogen atom and $n$ represents 0 or an integer from 1 to 4: and the corresponding anion and cation exchangers utilizing the defined copolymer as a matrix.

---

It is known that crosslinked acrylate polymers can be produced by copolymerising esters of acrylic acid with compounds containing at least two polymerisable double bonds. Such compounds are referred to as crosslinking agents or crosslinkers. A wide variety of compounds have already been used as crosslinkers, examples including divinyl benzene, allyl or vinyl methacrylate, ethylene glycol dimethacrylate, ethylene glycol diacrylate, other polyunsaturated carboxylic acid esters, and vinyl, allyl and homologous ethers.

It has further been proposed to produce the aforementioned copolymers with incorporation of other polymerisable compounds containing olefinic double bonds, such as vinyl alcohol or vinyl chloride.

These known crosslinked acrylate copolymers do not meet all requirements and in fact show various deficiencies and defects, depending upon the type of crosslinker used. For example copolymers of acrylates and polyunsaturated carboxylic esters or polyunsaturated ethers are not resistant to hydrolysis and dissolve gradually when subjected to hydroysis with strong acids or alkalis.

The copolymers obtained with divinyl benzene as the crosslinker are never uniformly crosslinked, and contain fairly large proportions of uncrosslinked, and hence soluble, polyacrylates. This is also the case when copolymers are produced from acrylates, divinyl benzene and a third polymerisable compound. If the copolymerisation is carried out in the presence of organic solvents, the solubility of the polymers is even considerably increased.

Object of this invention are crosslinked acrylate copolymers which are resistant to hydrolysis and at the same time insoluble, especially in water and organic solvents. Such acrylate copolymers are obtained if esters of acrylic acid and optionally a further copolymerisable monomer are polymerised with the aid of a catalyst in the presence of a carboxylic acid or carboxylic acid derivative containing two unconjugated polymerisable double bonds having the general formula $$X-A-Y$$
$$|$$
$$Z_n$$

wherein A represents an aromatic or cycloaliphatic radical, such as a radical derived from benzene, naphthalene, biphenyl or diphenylmethane, X represents an alkyl radical containing a terminal olefinic unsaturation such as a vinyl, allyl or isopropenyl radical or has the same meaning as Y, Y represents the radical $$-C=C-R'$$
$$|\ \ |$$
$$R\ \ R$$

wherein R represents a hydrogen atom or a lower alkyl radical and R' represents a carboxy, alkoxycarbonyl, cycloalkoxycarbonyl, phenoxycarbonyl, chlorocarbonyl, carbamoyl or cyano radical, Z represents a lower alkyl radical or a halogen atom and $n$ represents 0 or an integer from 1 to 4. A further hydrolysis-resistant crosslinking agent may be used simultaneously.

Thus when Y represents the radical $$-C=C-R'$$
$$|\ \ |$$
$$R\ \ R$$

and $n$ is zero, the carboxylic acids and carboxylic acid derivatives have the formula $$X-A-C=C-R'$$
$$|\ \ |$$
$$R\ \ R$$

wherein A is phenylene, naphthylene, diphenylene or bis (phenylene) methane.

The following are examples of carboxylic acids and carboxylic acid derivatives containing two unconjugated polymerisable double bonds which are suitable for the purpose of the present invention: p-vinylcinnamic acid; m-vinylcinnamic acid; p-isopropenylcinnamic acid; m-isopropylcinnamic acid; benzene-bis-1,4-(β-acrylic acid); benzene-bis - 1,3 - (β-acrylic acid); diphenyl-bis-2,2'-(β-acrylic acid); diphenylmethane-bis-4,4'-(β-acrylic acid); naphthalene-bis-1,4-(β-acrylic acid); naphthalene-bis-1,3- (β-acrylic acid); naphthalene-bis-1,5-(β-acrylic acid); naphthalene-bis-2,6-(β-acrylic acid); and esters and nitriles thereof.

These compounds may be prepared by reacting a corresponding aldehyde containing an alkenyl group, or a dialdehyde with malonic acid. The reaction may be carried out, for example, in an inert solvent at a temperature in the range from 50 to 150° C., optionally in the presence of a basic catalyst.

Of the aforementioned carboxylic acids and carboxylic acid derivatives, the dicarboxylic acid derivatives containing two polymerisable double bonds are particularly preferred and, of these, benzene-bis-acrylic acid derivatives, for example, benzene-bis-1,4-(β-acrylic acid methyl ester); benzene-bis - 1,4 - (β-acrylic acid butylester); benzene-bis - 1,3 - (β-acrylic acid methyl ester); and benzene-bis - 1,4 - (β-acrylonitrile), are particularly suitable.

Other crosslinking agents that may be used as further crosslinking agents for the purposes of the present invention include aromatic divinyl and polyvinyl compounds, such as divinyl benzene, trivinyl benzene, divinyl toluene, divinyl xylene and divinyl naphthalene.

Further compolymerisable monomers may be used in conjunction with acrylates and the crosslinkers in the production of the copolymers according to the present invention. The following are examples of suitable further copolymerisable monomers: aromatic monovinyl compounds, such as styrene and substituted styrenes; vinyl esters; vinylidene chloride; esters of α,β-olefinically unsaturated carboxylic acids, such as methacrylates; and conjugated diolefins which do not react as crosslinkers, such as butadiene, isoprene and chloroprene. These additional monomers are preferably used in quantities of from about 1 to 50% by weight, based on the total weight of the monomers. The mechanical properties of the end products may be varied by the inclusion in the polymers of the further monomers.

The above-mentioned monomers may be copolymerised by methods know per se, in bulk, solution, suspension or emulsion. In one preferred embodiment, the monomers are copolymerised in aqueous suspension. The conventional compounds that form free radicals, such as organic or inorganic peroxidic compounds or azo-group-containing catalysts, for example acetyl peroxide, benzoyl peroxide, lauroyl peroxide, cumene hydroperoxide and azodiisobutyronitrile, may be used as the polymerisation catalysts. The effect of these catalysts can be intensified by the use of heat and/or actinic rays. It is also possible to use so-called activators such as inorganic, oxidisable oxygen-containing sulphur compounds or tertiary amines, in addition to the above-mentioned catalysts. In this embodiment, the copolymers are obtained in the form of microspheres or beads, whose size can be influenced by the speed of agitation, by the use of suspending agents such as kaolin, polyvinyl alcohol or methyl cellulose, and by regulating the temperature.

To produce copolymers with a wide-pore structure, polymerisation may also be carried out by the method disclosed in German Auslegeschrift No. 1,113,570, i.e. in the presence of organic solvents in which the monomers are soluble, but the polymer is insoluble and non-swellable or only slightly swellable. Examples of such organic non-solvents and non-swelling agents for the polymers include aliphatic hydrocarbons, alcohols, ethers, nitro compounds and esters.

The extent to which the polymers are crosslinked may be varied within wide limits. For example, monomer mixtures of from 1 to 25% by weight, and preferably from 3 to 15% by weight, of a carboxylic acid containing two polymerisable double bonds, or a derivative thereof, and from 99 to 75% by weight, and preferably from 97 to 85% by weight, of an acrylate, may be used to prepare the acrylate copolymers. In one particularly preferred embodiment of the process, a further crosslinking agent, for example divinyl benzene, is used in addition to the acrylate and a carboxylic acid or carboxylic acid derivative of the above-mentioned type. In this preferred embodiment, the monomer mixture to be polymerised contains, in addition to the acrylate, from 0.5 to 12% by weight, and preferably from 0.5 to 5% by weight, of a doubly-unsaturated carboxylic acid or of a derivative thereof, and from 2 to 10% by weight, and preferably from 3 to 8% by weight, of the further crosslinker, preferably divinyl benzene.

Polymerisation is carried out by methods known per se. A suitable polymerisation process is described, for example, in Houben-Weyl, "Methoden der organischen Chemie," vol. XIV, 1 (1961), pp. 1053–1057.

Esters of acrylic acid, i.e. acrylates which can be used in the process according to the invention include the esters of short-chain normal and branched aliphatic and cycloaliphatic alcohols and phenyl esters. Esters with aliphatic alcohols containing from 1 to 4 carbon atoms are particularly suitable. Examples are methylacrylate, ethylacrylate and phenylacrylate.

The use of the doubly-unsaturated carboxylic acids or carboxylic acid derivatives as crosslinking agents provides copolymers which are completely and uniformly crosslinked so that no uncrosslinked portions can be dissolved out of them. The crosslink itself is resistant to hydrolysis. Accordingly, the polymers may always replace conventional acrylate polymers with considerably advantage where resistance to hydrolysis and aminolysis and insolubility are required.

The copolymers produced in accordance with the present invention are examined for contents of uncrosslinked, i.e. soluble components, by extraction with suitable solvents, followed by analysis of the dissolved substances present in the extractant.

One particular field of application of the copolymers crosslinked in accordance with this invention is the production of weakly acidic or weakly basic ion exchange resins. It has already been proposed to produce weakly acidic carboxylic groups containing cation exchange resins from copolymers of acrylic acid esters and compounds containing two polymerizable carbon double bonds, for instance divinyl benzene, divinyl, diallyl and homologous ethers as crosslinking agents.

By means of alkaline or acidic hydrolysis of these copolymers (compare for instance Houben-Weyl "Methoden der organischen Chemie," vol. XIV/2 (1963), p. 705 et seq.) weakly acidic carboxylic acid groups containing cation exchange resins are produced. By reacting with polyamines weakly basic anion exchange resins can be obtained.

In view of the poor polymerizability and the insufficient resistance against hydrolysis of the above mentioned doubly unsaturated ethers, only those acrylic acid ester polymers have become practically useful for producing carboxylic cation exchange resins, which have been crosslinked with divinyl benzene.

As indicated above, even if divinyl benzene is used as a crosslinking agent, the copolymers obtained are only incompletely crosslinked and contain relatively high amount of uncrosslinked and hence soluble polyacrylic acid esters.

In order to use those copolymers for producing weakly acidic ion exchange resins it is essential that the crosslinker molecules are resistant against hydrolysis and that the polymers are at the same time completely crosslinked. Any content of uncrosslinked or weakly crosslinked polyacrylic acid esters which is obtained when divinyl benzene is the crosslinking agent, is detrimental and constitutes an essential disadvantage as the uncrosslinked or weakly crosslinked polymer constitutents become soluble if the ester groups are hydrolysed, for instance with strong alkalis at elevated temperatures. For these reasons it is impossible to use incompletely crosslinked cation exchange resins in producing drinkable water, as the uncrosslinked constituents are dissolved rather quickly in the water and the weakly crosslinked constituents are also slowly dissolved.

Essentially the same situation arises if the polymers are subjected to aminolysis with monovalent amines (as related to the aminolysis reaction). This means for instance in the aminolysis with N,N-dimethyl-ethylene diamine, N,N-dimethylpropylene diamine - (1,3), N,N - diethylpropylene diamine-(1,3).

According to the present invention it has been found that weakly acidic or weakly basic ion exchange resins with markedly improved properties are obtained by using the above described copolymers of acrylic acid esters, carboxylic acids or derivatives of carboxylic acids having two non-conjugated polymerizable double bonds and containing optionally a further hydrolysis-resistant crosslinking agent for their production.

The ester groups in the copolymers of acrylates, doubly-unsaturated carboxylic acids or carboxylic acid derivatives of the above-mentioned type and optionally a further cross-linker such as divinyl benzene, may be hydrolysed by known processes (cf. Houben-Weyl, Methoden der organischen Chemie, vol. XIV/2 (1963), p. 705 et seq.). Aminolysis of the ester group is carried out for example by the method disclosed in U.S. patent specification No. 2,675,359, especially in column 2, line 45 to column 4, line 19, which is included by reference.

The ion exchanger resins are obtained in excellent yields. They are insoluble in alkalis and acids and thus satisfy even most stringent requirements.

The ion-exchanger resins produced in accordance with the present invention are examined for the presence in them of uncrosslinked, i.e. soluble components by extraction with water, followed by analysis of the dissolved substances present in the extractant.

EXAMPLE 1

(a) Comparison test

Preparation of the polymer:

A mixture of 828 g. of methyl acrylate, 72 g. of commercial divinyl benzene (62.5% pure, remainder ethyl styrene), corresponding to 5% by weight of pure divinyl benzene, based on the total quantity of monomers, and 6 g. of 75% dibenzoyl peroxide is suspended in 900 ml. of water containing 1.35 g. of methyl cellulose, and the resulting suspension is bead-polymerised for 5 hours at 65° C. and then for 2 hours at 90° C. The beads thus obtained are then dried in vacuo at 100° C. Yield=841 g. (93.5% of the theoretical).

A sample of the bead polymer thus obtained, dried until constant in weight, is extracted with benzene. After extraction for 40 hours, the evaporation residue from benzene amounts to 5.2% by weight and the reduction in weight of the sample to 5%. The extraction test was then stopped.

Preparation of the ion exchanger:

550 g. of the bead polymer obtained as described above are boiled under reflux for 8 hours in 1300 ml. of 45% by weight sodium hydroxide and 650 ml. of methanol. After the reaction liquid has been extracted, the cation exchanger is introduced into excess 20% by weight hydrochloric acid and then washed until neutral in a filter tube. Yield=1290 ml.

200 ml. of the cation exchanger thus produced are extracted for 20 hours with fully desalted water in a Soxhlet apparatus. The extract has an acid content of 21.4 mvals.

(b) Tests according to the invention

If the 5% by weight of divinyl benzene used in the above example is replaced by 5% by weight of benzene-bis-1,3-($\beta$-acrylic acid methyl ester), a bead polymer is obtained in a yield of 97% which, following thorough extraction with benzene, undergoes a reduction in weight of 0.6%. The evaporation residue from benzene comprises 0.5% by weight, based on the head polymer used.

If 550 g. of this bead polymer are hydrolysed as described above to form an ion exchanger, and if 200 ml. of the resulting exchanger, obtained in a yield of 2070 ml., are extracted as described above, the extract is found to contain 0.1 mval of acid.

(ii) When 5% by weight of benzene-bis-1,4-($\beta$-acrylic acid butylester) is used instead of the divinyl benzene, the yield of bead polymer comprises 98%, and the evaporation residue from benzene comprises 0.5 to 1.0% by weight. If this material is hydrolysed to form the cation exchanger, extraction of the cation exchanger, obtained in a yield of 2055 ml., reveals an acid content of 0.3 mval.

(iii) When 3% by weight of benzene-bis-1,4-($\beta$-acrylic acid methyl ester) is used instead of the divinyl benzene, a bead polymer is obtained which, following thorough extraction with benzene, undergoes a reduction in weight of 1%. After hydrolysing this material a cation exchanger is obtained, which an extraction reveals an acid content of 0.1 mval.

EXAMPLE 2

(a) Comparison test

Preparation of the polymer:

A mixture of 784 g. of methyl acrylate, 116 g. of commercial divinyl benzene (61.9% pure, remainder ethyl styrene), corresponding to 8% by weight of pure divinyl benzene, based on the total monomer, and 6 g. of 75% pure dibenzoyl peroxide, is suspended in 900 ml. of water containing 1.35 g. of methyl cellulose, and the resulting suspension is bead polymerised for 5 hours at 65° C. and then for 2 hours at 90° C. The beads thus obtained are dried in vacuo at 100° C. Yield=868 g. (96.5% of the theoretical).

A sample of the bead polymer thus obtained, dried until constant in weight, undergoes a reduction in weight The evaporation residue from benzene comprises 2.4% by weight based on the bead polymer used.

Preparation of the ion exchanger:

550 g. of the bead polymer obtained as described above of 2.5% following thorough extraction with benzene. are hydrolysed and worked up as described in Example 1. Yield=1052 ml. of cation exchanger resin.

After extraction of 200 ml. of exchanger for 20 hours with fully desaltes water, the extract was found to have an acid content of 6.8 mvals.

(b) Tests according to the invention (i) If the 8% by weight of divinyl benzene used in the above example are replaced by 5% by weight of divinyl benzene and 2% by weight of benzene-bis-1,4-($\beta$-acrylic acid methyl ester), the bead polymer obtained in a yield of 97% of theoretical undergoes a reduction in weight of from 0.5 to 0.8% following thorough extraction with benzene. If the product is hydrolysed as described in Example 1 to form a cation exchanger, 1210 ml. of exchanger resin are obtained. The extract from the exchanger sample is found to have an acid content of from 0.5 to 0.7 mvals.

(ii) When 8% by weight of divinyl benzene and 2% by weight of benzene-bis-1,4-($\beta$-acrylic acid methyl ester) are used in the above example, the bead polymer obtained undergoes a reduction in weight of from 0.4–0.5% following thorough extraction with benzene.

If the product is hydrolysed as described in Example 1 960 ml. of cation exchanger resin are obtained. The extract from the exchanger sample is found to have an acid content of from 0.5 to 0.7 mvals.

(iii) If 5% by weight of divinyl benzene and 3% by weight of benzene-bis-1,3-($\beta$-acrylic acid methyl ester) or 3% by weight of benzene-bis-1,4-($\beta$-acrylic acid butyl ester) are used instead of 8% by weight of divinyl benzene in the above example and the resulting polymers, obtained in yields of 97% of theoretical and 98% of theoretical, respectively, are thoroughly extracted with benzene as described above, residues of 0.2 and 0.6% by weight respectively, based on the amount of resin used, are obtained following evaporation of the benzene. If these products are hydrolysed as described in Example 1 to form cation exchangers, the cation exchangers are obtained in yields of 1265 ml. and 1235 ml., respectively. After 200 ml. samples of these exchangers have been extracted, the extracts are found to have acid content of 0.2 and 0.8 mvals., respectively.

(iv) If 7% by weight of divinyl benzene and 1% by weight of benzene-bis-1,4-($\beta$-acrylonitrile) are used in the above example, a polymer is obtained which, following extraction with benzene, undergoes a weight loss of 0.5%. 1070 ml. of cation exchange resin are obtained by hydrolysis. 200 ml. of the exchanger resin thus obtained give off 0.9 mval. of acid after extraction for 20 hours.

EXAMPLE 3

(a) Comparison test

Preparation of the polymer:

A mixture of 655 g. of methyl acrylate, 95 g. of commercial divinyl benzene (63.2% pure, remainder ethyl styrene), corresponding to 8% by weight of pure divinyl benzene, based on the total amount of monomers, 75 g. of hydrogenated triisobutylene, and 5 g. of 75% pure dibenzoyl peroxide is suspended in 750 ml. of water, in which 1.12 g. of methyl cellulose are dissolved, and the resulting suspension is bead polymerised and dried as described in Example 1. Yield=724 g. (96.5% of the theoretical).

A dried sample of the resin is extracted in accordance with Example 2. The evaporation residue from benzene comprises 5% by weight.

Prepartion of the ion exchanger:

550 g. of the bead polymer obtained as described above are hydrolysed and worked up as described in Example 1. Yield=1260 ml. of cation exchanger resin.

Following extraction of the cation exchanger in accordance with the procedure described in Example 1, the extract is found to have an acid content of 16.2 mvals.

(b) Tests according to the invention (i) If 5% by weight of divinyl benzene and 3% by weight of benzene-bis-1,3-($\beta$-acrylic acid methyl ester) are used in the above example instead of 8% by weight of divinyl benzene, a bead polymer is obtained in a yield of 99% of theoretical and following extraction undergoes a weight loss of 0.3%. 1420 ml. of cation exchanger resin are obtained by hydrolysis. Following extraction of the exchanger, the extract is found to have an acid content of 0.1 mval.

(ii) The use of 5% by weight of divinyl benzene and 3% by weight of benzene-bis-1,4-($\beta$-acrylic acid butyl ester) in the above example gives a bead polymer (yield= 98% of theoretical) which following extraction, undergoes a weight loss of 1.3%. Hydrolysis gives 1370 ml. of cation exchanger resin. In this case, the extract has an acid content of 0.4 mval.

EXAMPLE 4

(a) Comparison test

Preparation of the polymer:

A mixture of 652 g. of methyl acrylate, 98 g. of commercial divinyl benzene (61.2% pure, remainder ethyl styrene), corresponding to 8% by weight of pure divinyl benzene, based on the total quantity of monomers, 150 g. of white spirit and 5 g. of 75% pure dibenzoyl peroxide, is suspended in 750 ml. of water in which 1.12 g. of methyl cellulose are dissolved, and the resulting suspension is bead polymerised and dried in accordance with Example 1. Yield=705 g. of bead polymer (94% of the theoretical).

When extracted with benzene, the bead polymer undergoes a reduction in weight of 9.5%, and the evaporation residue from benzene comprises 9.3% by weight, based on the polymer used.

Preparation of the ion exchanger:

550 g. of the bead polymer obtained as described in the foregoing are hydrolysed and worked up as described in Example 1. Yield 1380 ml. of cation exchanger resin.

200 ml. of cation exchanger resin are extracted as described in Example 1. The extract has an acid content of 27 mvals.

(b) Tests according to the invention (i) If 5% by weight of divinyl benzene and 2% by weight of benzene-bis-1,4-($\beta$-acrylic acid methyl ester) are used in the above example instead of 8% by weight of divinyl benzene, iso-octane replacing the white spirit, a bead polymer is obtained which, following thorough extraction with benzene, undergoes a reduction in weight of from 0.9 to 1.1%.

Hydrolysis gives 1760 ml. of cation exchanger resin. After the exchanger has been extracted in accordance with the procedure of Example 1, the extract is found to have an acid content of 0.1 mval.

(ii) If the same crosslinkers are used in the same quantities with hydrogenated triisobutylene replacing iso-octane, extraction of the bead polymer produces a loss in weight of 1.4%.

EXAMPLE 5

(a) Comparison test 200 g. of the bead polymer of Example 2 containing 8% by weight of divinyl benzene are stirred for 5 hours in a pressure vessel at 165–170° C. with 800 g. of 99% pure 1-amino-3-dimethylaminopropane. The reaction product is separated from the reaction liquid in a filter tube and then washed until neutral. The yield of 880 ml. of anion exchanger resin gives 290 g. of dry product.

(b) Tests according to the invention

If 5% by weight of divinyl benzene and 3% by weight of benzene-bis-1,4-($\beta$-acrylic acid butyl ester) are used instead of 8% by weight of divinyl benzene in the preparation of the bead polymer according to Example 2, and the same procedure is otherwise followed, the yield comprises 960 ml. of anion exchanger and 346 g. of dry product.

What is claimed is:

1. A homogenous or macroreticular hydrolysis-resistant, insoluble crosslinked copolymer of an acrylic acid ester and 1 to 25% by weight, based on the total monomers, of a crosslinking agent of the formula

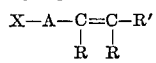

wherein A is phenylene, naphthylene, diphenylene or bis (phenylene) methane; X is vinyl, allyl, isopropenyl or

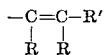

R is hydrogen or lower alkyl and R' is carboxy, alkoxycarbonyl or cyano.

2. The copolymer of claim 1 wherein R is hydrogen.

3. The copolymer of claim 1 wherein an additional cross-linking agent is utilized, said additional cross-linking agent being divinyl benzene, trivinyl benzene, divinyl toluene, divinyl xylene or divinyl naphthylene.

4. The copolymer of claim 1 containing polymerized therewith styrene, substituted styrene, vinyl ester, vinylidene chloride, methacryic acid ester, butadiene, isoprene or cloroprene.

5. The copolymer of claim 1 wherein 3 to 15% by weight of cross-linking agent is utilized.

6. A cation exchanger obtained by hydrolyzing ester groups of a matrix consisting of the copolymer of claim 1.

7. A cation exchanger obtained by hydrolyzing ester groups of matrix consisting of the copolymer of claim 2.

8. A cation exchanger obtained by hydrolyzing ester groups of a matrix consisting of the copolymer of claim 3.

9. An anion exchanger obtained by aminolyzing the ester groups of a matrix consisting of the copolymer of claim 1.

10. An anion exchanger obtained by aminolyzing the ester groups of a matrix consisting of the copolymer of claim 2.

11. An anion exchanger obtained by aminolyzing the ester groups of a matrix consisting of the copolymer of claim 3.

References Cited

UNITED STATES PATENTS

| | | | |
|---|---|---|---|
| 2,340,111 | 1/1944 | D'Alelio | 210—24 |
| 2,557,189 | 6/1951 | Irany et al. | 260—78.5 |
| 3,427,262 | 2/1969 | Corte et al. | 260—2.2 |

WILLIAM SHORT, Primary Examiner

M. GOLDSTEIN, Assistant Examiner

U.S. Cl. X.R.

260—2.2, 80.7, 80.8, 80.81, 85.5, 86.1